Feb. 5, 1929.

G. L. HANSEN 1,701,184

METHOD AND APPARATUS FOR TESTING GEARS

Filed July 24, 1922   3 Sheets-Sheet 1

Inventor
GUSTOF. L. HANSEN

Feb. 5, 1929.

G. L. HANSEN 1,701,184

METHOD AND APPARATUS FOR TESTING GEARS

Filed July 24, 1922    3 Sheets-Sheet 2

Inventor
Gustof. L. Hansen.

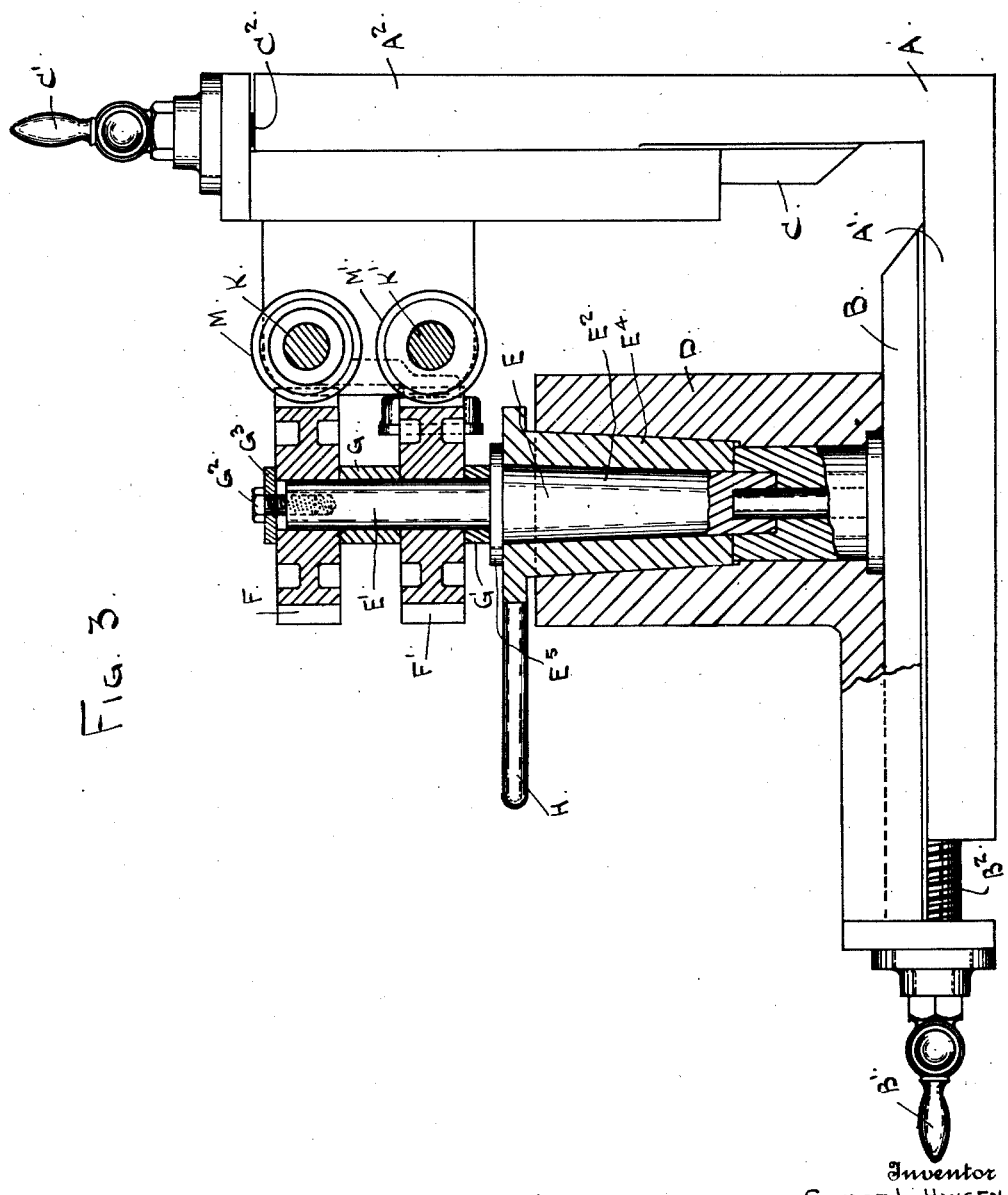

Patented Feb. 5, 1929.

1,701,184

UNITED STATES PATENT OFFICE.

GUSTOF L. HANSEN, OF DETROIT, MICHIGAN, ASSIGNOR TO GEAR GRINDING MACHINE COMPANY, OF DETROIT, MICHIGAN, A CORPORATION OF MICHIGAN.

METHOD AND APPARATUS FOR TESTING GEARS.

Application filed July 24, 1922. Serial No. 577,183.

The invention relates to machines for testing gears and more particularly to that type of machine which measures the tooth contour of the gear.

The object of the invention is to compare the tooth curve of a gear with that of a similar master gear and to accurately measure any variations between the two. To this end the gears are mounted upon a common axis and cooperating members are arranged to respectively engage a gear tooth on each of the gears. Preferably the cooperating members are mounted for linear movements parallel to each other and a sensitive indicating device provided for measuring the differential linear travel while the gears are simultaneously rotated. If the gear to be tested has exactly the same contour as the master gear no differential travel will be observed but any inaccuracy of the tooth contour will be registered upon the indicating device. By testing gears in this manner it is possible to rapidly determine whether or not the gears are sufficiently accurate to pass the required inspection test.

In the drawings:—

Figure 3 is a side elevation partly in section.

Figure 1:
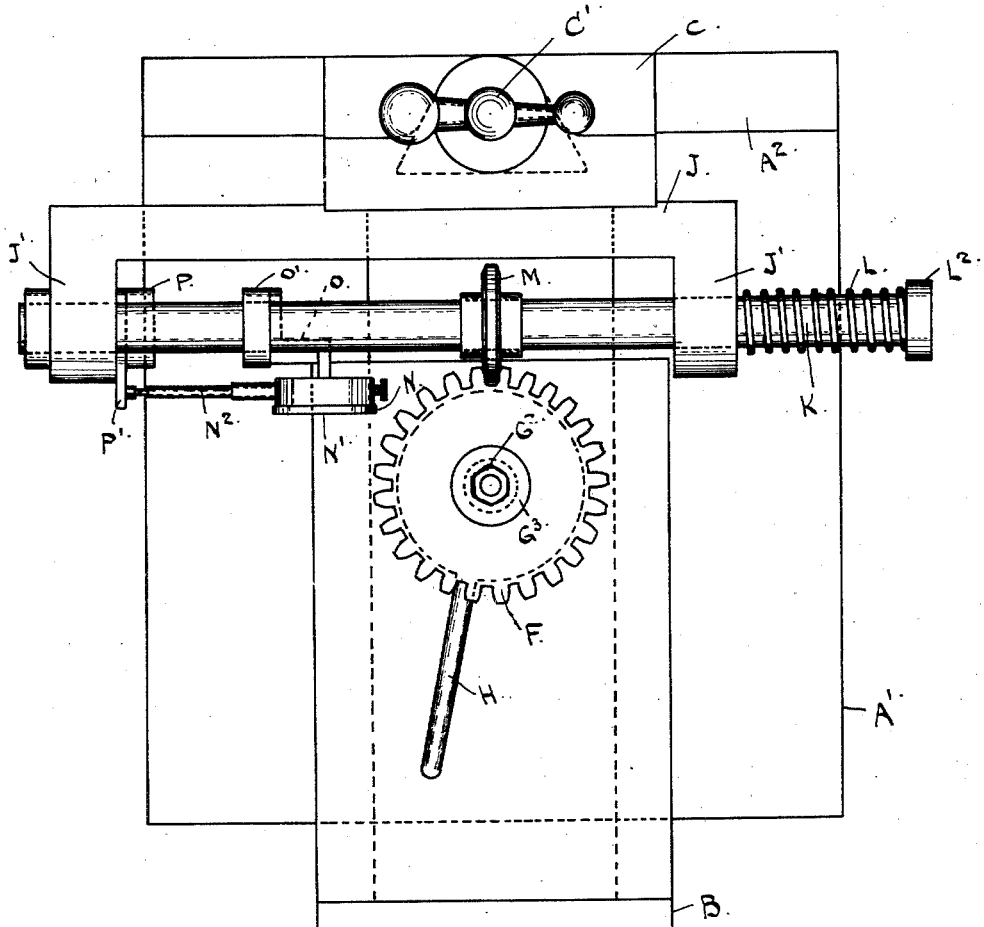
Figure 1 is a plan view of the gear testing machine.
Figure 2:
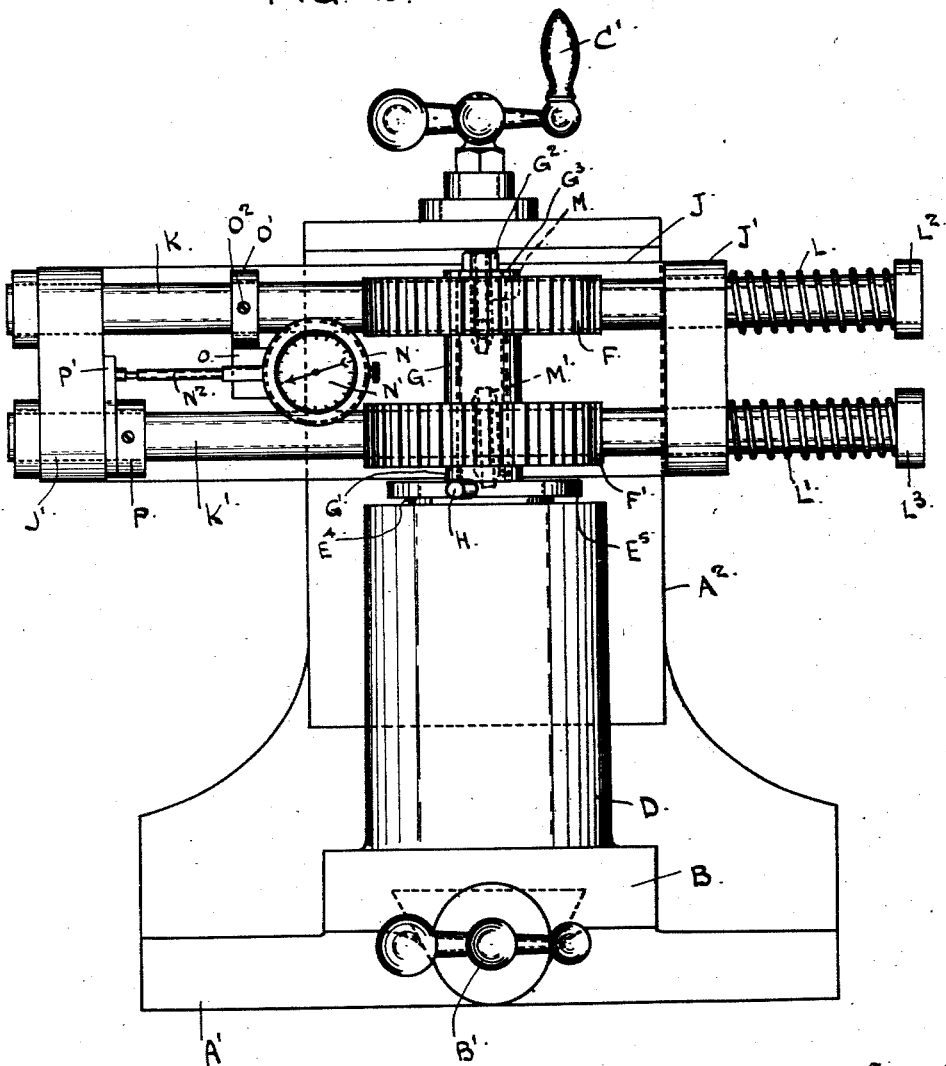
Figure 2 is a front elevation thereof.

In general construction the machine consists of a rotatable arbor on which the gear to be tested and a master gear are secured and means for simultaneously revolving the gears. Two longitudinally slidable rods having projecting members adapted to engage the gear teeth of the respective gears are mounted tangential to the gears. Preferably the projecting members have their contacting surfaces at an angle to the axes of the rods corresponding to the pressure angle of the gear tooth to be measured altho other angles may be chosen providing both projecting members are made similar. The differential travel of the rods is measured by an indicator which is supported upon one of the rods and has its stem in contact with an abutment upon the other, the readings on the dial thus indicating the inaccuracy of the gear to be tested.

In my preferred construction, as shown in the accompanying drawings, A is a frame for the machine having the two portions A' and $A^2$ extending at right angles to each other on which are respectively mounted the carriages B and C. Suitable means for adjusting the carriages is provided such as the handle members B' and C' which rotate the screws $B^2$ and $C^2$ into threaded engagement respectively with the frame portions A' and $A^2$.

The carriage B supports a transversely extending pedestal D in which is rotatably mounted a spindle E having at one end a cylindrical portion E' of a suitable diameter to receive the gear to be tested F. The spindle is provided with an annular flange $E^5$ which forms an abutment against which the gear F and a similar master gear F' may be clamped. A tubular member G is sleeved upon the spindle E to space the gears F and F' and another tubular member G' is sleeved upon the spindle between the master gear F' and the flange $E^5$. Any suitable clamping means may be provided for clamping the gears upon the spindle but as shown a screw $G^2$ extends through the clamping disk $G^3$ and threadedly engages the spindle E'.

The spindle is rotatably mounted in the pedestal D in any suitable manner which will maintain the axis fixed during the various positions of rotative adjustment and as shown, the lower portion of the spindle $E^2$ is tapered and is sleeved in the tapering bushing $E^4$. A handle member H is secured to the spindle and extends outwardly therefrom and forms a suitable means for rotating the gears together.

Mounted upon the carriage C is a frame J, the end portions of which J' carry the slidable rods K and K', the axes of which are parallel to each other and in planes perpendicular to the axis of the spindle E. The projecting members M and M' which are adapted to enter a tooth space of the gears F and F' respectively are secured to the rods and are held in engagement with the sides of the corresponding gear teeth by springs L and L' which are respectively sleeved upon the rods K and K' between the frame ends J' and the collars $L^2$ and $L^3$. Preferably the projecting members M and M' are tapered disks the cross section of which forms a rack tooth having the same pressure angle as the gear to be measured and capable of cooperating with the gear in the manner of a rack and pinion. By using this form of tooth equal angular rotations of the gear gives corresponding equal linear movements of the projecting members and the rods on which they are secured. An indicator N having a dial N' and an actuating stem N² is secured to one of the rods such as K by means of an arm O and the collar O' adjustable on the rod by means of a set screw O². The other rod K' is provided with an adjustable collar P and an arm P' secured thereto extends into engagement with the stem N² of the indicator.

In the operation of the machine the master gear and the gear to be tested are clamped upon the spindle E and the carriages B and C are so adjusted that the projecting disks M and M' enter corresponding tooth spaces in the gear F and the master gear F' and are held in yielding contact with the respective teeth by means of the springs L and L'. The collars O' and P are then adjusted on the respective rods K and K' so that the stem of the indicator N² is in operative relation with the arm P'. The gears are then rotated together by means of the handle H which causes the rods K and K' to be moved longitudinally. If the gear F has exactly the same tooth contour as the master gear both of the rods K and K' will be moved through corresponding linear distances and there will be no movement registered upon the indicator; however any inaccuracy of the tooth contour of the gear F will cause a differential movement of the rods which will be recorded upon the indicator.

What I claim as my invention is:—

1. The method of determining the accuracy of a gear which consists in mounting the gear for rotation about its axis, mounting a master gear for rotation about its axis, rotating the two gears through equal angular distances, converting the rotary motion of each gear into rectilinear motion of an associated member, and measuring the difference between the extents of the rectilinear motions of the respective associated members.

2. The method of determining the accuracy of a gear which consists in mounting the gear for rotation about its axis, mounting a master gear for rotation about its axis, simultaneously rotating the two gears through equal angular distances, converting the rotary motion of each gear into rectilinear motion of an associated member, and measuring the difference between the extents of the rectilinear motions of the respective associated members.

3. A gear testing machine comprising a spindle for receiving a gear and a master gear, means for simultaneously rotating said gears about the axis of said spindle, members arranged to contact with the teeth of the respective gears and adapted to be moved by said gear tangentially relative to said fixed axis, and means for measuring the differential travel of said members.

4. The method of determining the accuracy of a gear which consists in mounting the gear for rotation about its axis, mounting a master gear for rotation about its axis, rotating the two gears through equal angular distances, converting the rotary motion of each gear into rectilinear motion of an associated member and visually indicating the extents of the rectilinear motions of the respective associated members.

5. A gear testing machine comprising a spindle for receiving a gear and a master gear, means for simultaneously rotating said gears about the axis of said spindle through equal angular movements, members having rack teeth sections cooperating respectively with the teeth of said gears, said members being mounted for rectilinear movements tangent to said gears and being moved directly by said gears, and means for measuring the differential travel of said members.

6. A gear testing machine comprising a spindle for receiving a gear and a master gear, means for simultaneously rotating said gears while on said spindle through equal annular distances, members arranged to contact with the teeth of the respective gears and adapted for rectilinear movements by said gears tangential to the respective gears, resilient means for normally holding said members in contact with said teeth, and means for measuring the differential travel of said members.

7. A gear testing machine comprising a spindle for receiving a gear and a similar master gear, means for simultaneously rotating said gears while on said spindle, through equal annular distances, a pair of longitudinally slidable rods, each having a member adapted to engage a tooth of one of said gears and each being adapted to be moved by its respective gear, resilient means for respectively holding said members in contact with the cooperating teeth, and means for indicating the differential travel of said rods.

8. A gear testing machine comprising a spindle for receiving a gear and a similar master gear, means for rotating said gears together while on said spindle, a member adapted for rectilinear motion relative to said spindle having a projecting portion in contact with a tooth surface of said master gear whereby the said member is actuated directly by the master gear, a similar second member having the projection thereon engaging with said other gear, and means for measuring the differential travel of said members.

9. A gear testing machine comprising a frame, a spindle for receiving a gear and a master gear, a rod slidable in said frame relative to said spindle, a projecting member upon said rod in engagement with a tooth surface of said master gear, a second rod slidable in said frame having a projecting member in engagement with a tooth surface of said other gear, and means for measuring the differential linear travel of said members for corresponding angular movements of said gears.

10. A gear testing machine comprising a frame, a spindle secured to said frame for receiving a gear and a similar master gear, means for simultaneously rotating said gears while on said spindle through equal angular movements, longitudinally slidable rods journaled in said frame having projecting portions in engagement respectively with tooth surfaces of said gears, and an indicator for measuring the differential linear movements of said rods during the rotation of said gears.

11. A gear testing machine comprising a frame, carriages slidably mounted upon said frame at right angles to each other, a spindle upon one carriage for receiving a gear and a similar master gear, parallel longitudinally slidable rods mounted upon the other of said carriages, a projecting member on one of said rods adapted to enter a tooth space of said master gear, means for yieldingly pressing said members in contact with corresponding tooth surfaces of said gears, means for simultaneously rotating said gears while on said spindle through equal angular movements, and an indicator for measuring the relative movements of said rods.

12. A gear testing machine comprising a spindle for receiving a gear and a master gear, means for rotating said gears while on said spindle through equal angular distances, members arranged to contact with the teeth of the respective gears and adapted for tangential movements by said gears relative thereto, and means for measuring the differential travel of said members.

13. A gear testing machine comprising a spindle for receiving a gear and a master gear, means for rotating said gears while on said spindle through equal angular distances, members arranged to contact with the teeth of the respective gears and adapted for rectilinear movements by said gears tangential to the respective gears, and means for measuring the differential travel of said members to indicate the inaccuracy of tooth contour of the gear being tested.

14. In a gear testing machine, the combination of means for mounting a gear to be tested and a master gear for rotation, means for rotating the said gears through equal angular distances, a movable member for each gear, means for converting the rotary motion of each gear into a rectilinear motion of its respective movable member and means carried by the said movable members for measuring the difference between the extents of the rectilinear motions of the respective movable members.

15. In a gear testing machine, the combination of means for mounting a gear to be tested and a master gear for rotation, means for simultaneously rotating the said gears through equal angular distances, a member associated with each gear and movable tangentially with respect thereto means for converting the rotary motion of each gear into a rectilinear motion of its respective movable member and means for visually indicating the difference between the extents of the rectilinear motions of the respective movable members.

16. In a gear testing machine, the combination of means for simultaneously rotating the gear to be tested and a master gear tooth form, a pair of members respectively engaging said master gear tooth and a tooth of the gear to be tested, said members being independently movable in rectilinear paths by said gears, and means for measuring the relative movement of said two members whereby the inaccuracy of the tested gear tooth is determined.

17. The method of comparing the tooth curve of one gear with that of a similar tooth curve which consists in impressing on an indicator the movements of corresponding parts of the two tooth curves so that the indicator will show the differences at corresponding points in the angular rotation of the two.

18. The method of comparing the tooth curve of one gear with that of a similar tooth curve which consists in impressing upon an indicator the rectilinear movements of two members respectively engaging corresponding parts of the two tooth curves so that the indicator will show the differences at corresponding points in the angular rotation of the two.

19. The method of comparing the tooth curve of one gear with a standard tooth curve on another gear which consists in simultaneously impressing on an indicator the rectilinear movements of two members respectively engaging corresponding parts of the two tooth curves so that the indicator will show the differences at corresponding points in the angular rotation of the two gears.

In testimony whereof I affix my signature.

GUSTOF L. HANSEN.